(12) United States Patent
van der Weide et al.

(10) Patent No.: US 10,402,604 B2
(45) Date of Patent: *Sep. 3, 2019

(54) RADIO-FREQUENCY IDENTIFICATION TAGS

(71) Applicant: vdW Design, LLC, Madison, WI (US)

(72) Inventors: Daniel W. van der Weide, Madison, WI (US); Marcos Martinez, Madison, WI (US)

(73) Assignee: vdW Design, LLC, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/632,887

(22) Filed: Jun. 26, 2017

(65) Prior Publication Data

US 2018/0012046 A1 Jan. 11, 2018

Related U.S. Application Data

(63) Continuation of application No. 14/593,833, filed on Jan. 9, 2015, now Pat. No. 9,690,962.

(60) Provisional application No. 61/926,005, filed on Jan. 10, 2014.

(51) Int. Cl.
*G06K 7/10* (2006.01)
*G06K 19/067* (2006.01)

(52) U.S. Cl.
CPC ..... *G06K 7/10366* (2013.01); *G06K 19/0672* (2013.01)

(58) Field of Classification Search
CPC .................. G06K 7/10366; G06K 19/0672
See application file for complete search history.

(56) References Cited

U.S. PATENT DOCUMENTS

| 9,489,813 | B1* | 11/2016 | Beigel | G08B 13/2417 |
| 2002/0014996 | A1* | 2/2002 | Keilen | H01Q 1/242 |
| | | | | 343/702 |
| 2007/0159332 | A1* | 7/2007 | Koblasz | A61B 5/1117 |
| | | | | 340/572.1 |
| 2008/0143519 | A1* | 6/2008 | Piotrowski | G06K 19/07372 |
| | | | | 340/540 |
| 2008/0229525 | A1* | 9/2008 | Hutton | B64F 1/002 |
| | | | | 14/71.5 |
| 2010/0237995 | A1* | 9/2010 | Iwahashi | G06K 17/00 |
| | | | | 340/10.1 |
| 2011/0012788 | A1* | 1/2011 | Rowell | H01Q 9/0414 |
| | | | | 343/700 MS |
| 2011/0051782 | A1* | 3/2011 | Gupta | H03H 11/12 |
| | | | | 375/140 |
| 2012/0075069 | A1* | 3/2012 | Dickey | H01Q 1/364 |
| | | | | 340/10.1 |
| 2012/0318872 | A1* | 12/2012 | Carrender | G06K 19/0723 |
| | | | | 235/488 |
| 2012/0322380 | A1* | 12/2012 | Nannarone | G08B 13/1427 |
| | | | | 455/41.2 |
| 2014/0354414 | A1* | 12/2014 | Karmakar | G06K 7/10306 |
| | | | | 340/10.3 |

(Continued)

*Primary Examiner* — Leon Flores
(74) *Attorney, Agent, or Firm* — Casimir Jones, S.C.; David W. Staple

(57) ABSTRACT

The present invention relates to radio-frequency identification (RFID) tags that produce a unique radar signature by passive reflection of an electromagnetic signal. In particular, provided herein are frequency-, phase-, and/or amplitude-shift encoded RFID tags, and methods of use and manufacture thereof.

11 Claims, 14 Drawing Sheets

(56) References Cited

U.S. PATENT DOCUMENTS

| | | | |
|---|---|---|---|
| 2015/0310327 A1* | 10/2015 | Karmakar | H01Q 1/2225 340/10.1 |
| 2016/0000374 A1* | 1/2016 | Dandekar | A61B 5/0002 600/301 |
| 2016/0042213 A1* | 2/2016 | Fagg | G06K 19/07345 340/10.1 |
| 2017/0124816 A1* | 5/2017 | Yang | G06Q 10/0833 |

* cited by examiner

RADIO-FREQUENCY IDENTIFICATION TAGS

CROSS REFERENCE TO RELATED APPLICATIONS

The present invention is a continuation of U.S. patent application Ser. No. 14/593,833, filed Jan. 9, 2015, now allowed, which claims the priority benefit of U.S. Provisional Patent Application No. 61/926,005, filed Jan. 10, 2014, each of which are incorporated by reference in their entireties.

FIELD

The present invention relates to radio-frequency identification (RFID) tags that produce a unique radar signature by passive reflection of an electromagnetic signal. In particular, provided herein are frequency-, phase-, and/or amplitude-shift encoded RFID tags, and methods of use and manufacture thereof.

BACKGROUND

Radio frequency identification (RFID) technology is used in many different applications, ranging from warehouse logistics (Cheung et al., 2008; herein incorporated by reference in its entirety) to livestock management (Kin Seong Leong et al., 2007; herein incorporated by reference in its entirety). This has been possible due to the flexibility of the technology adapted to different requirements including active and passive tags, near/far field communications or the use of different frequency bands. In essence, all these tags, even though they may lack an internal power source (so-called "passive" tags), nonetheless rely on a silicon chip connected to an antenna. The tags store an identification code that can be retrieved wirelessly by an RFID reader. This setup, although flexible and powerful, has some disadvantages. Among these disadvantages, probably the most important, that limits its widespread application, is the cost. In certain applications, RFID needs to offer a competitive cost that can compete with other identification technologies, such as optical barcodes.

Furthermore, there are important applications for remotely sensing strain, angle, displacement and other related quantities, such as in airframes, bridges and other structures, and even in human performance (e.g. sports medicine and rehabilitation), wherein the movement, angle or displacement of a body part (e.g. an ankle, knee, elbow, shoulder, wrist) should be tracked over time.

SUMMARY

The present invention relates to radio-frequency identification (RFID) tags that produce a unique radar signature by passive reflection of an electromagnetic signal. In particular, provided herein are frequency-, phase-, and/or amplitude-shift encoded, chipless RFID tags and methods of use and manufacture thereof. In some embodiments, tags are polarization-independent. In other embodiments, tags rely on polarization modulation. In some embodiments, tags comprise a patch (e.g., circular) with a plurality (e.g., three) of slot resonators (e.g., circular slot resonators) nested in it. In some embodiments, the shape (e.g., circular) and arrangement of the slot resonators (e.g., radially symmetric), makes the tag polarization independent, and improving tag readability from different angles and directions with respect to a reader antenna. In some embodiments, patterns are fabricated onto deformable (e.g., flexible, stretchable, etc.) substrates, and the resulting radar signatures from the tags are altered according to the deformation of the substrate, indicating strain, angle, displacement and other related quantities.

In some embodiments, a tag comprises a single layer. In such embodiments, a tag can be produced by conductive ink printing. In some embodiments, the tag can be formed onto a flexible, even elastic, substrate so that its geometry is reversibly (or non-reversibly) altered in accordance with changes in the underlying structure.

In certain embodiments, a patch tag is provided comprising a thin conductive material mounted within or upon a non-conductive or dielectric surface, material, or substrate. In some embodiments, one or more slot resonators are present within the conductive material (or between segments of conductive material). In some embodiments, when the patch tag is queried with an electromagnetic wave, each of the one or more slot resonators reflects the electromagnetic wave at a specific identifiable frequency. When a plurality of slot resonators is present in or on a patch tag, the plurality of identifiable frequencies produces an electromagnetic signature of the tag. In some embodiments, the substrate portion of a patch tag is flexible, bendable, malleable, elastic, or otherwise physically deformable in one (e.g. elongation), two (e.g., stretching) or three (e.g., bending, folding, twisting, etc.) dimensions. In some embodiments, alteration of the shape of the substrate (e.g., by bending, stretching, folding, expanding, contracting, or otherwise deforming) modifies the shape, orientation, and/or pattern of the conductive material and/or slot resonators, and thereby alters the frequencies reflected by the conductive material and/or slot resonators. In some embodiments, the conductive material is also deformable. In some embodiments, one or both of the substrate and conductive material readopt a native conformation following release of a deforming force. In other embodiments, one or both of the substrate and conductive material retain a deformed conformation following release of a deforming force. In some embodiments, deformation of the substrate results in detectable modification of the electromagnetic signature of the tag. In some embodiments, a tag exhibits an first electromagnetic signature in its native conformation (e.g., a conformation adopted without application of external forces), and at least a second electromagnetic signature in one or more deformed conformations (e.g., elongated, folded, bent, stretched, twisted, contracted, condensed, etc.). In some embodiments, a tag exhibits two or more (e.g., 2, 3, 4, 5, 6, 7, 8, 9, 10, 20, 50, 100, 1000, or more) electromagnetic signatures, each corresponding to a different state or degree of deformation. In some embodiments, query of a tag with an electromagnetic signal or radiation allows for identification of the state or degree of deformation based upon the reflected electromagnetic signature. In some embodiments, detection of the reflected electromagnetic signature as a function of time (e.g., at various time-points, in real time, etc.) allows for monitoring of changes in the shape or deformation state of the patch.

In some embodiments, tags operate in a frequency band between 3.1 and 10.6 GHz (e.g., 3.1-4.0 GHz, 4.0-5.0 GHz, 5.0-6.0 GHz, 6.0-7.0 GHz, 7.0-8.0 GHz, 8.0-9.0 GHz, 9.0-10.0 GHz, 10.0-10.6 GHz), 60 GHz, or any suitable frequency or frequency range to be regulation compliant (e.g., ECC and/or FCC regulations for ultra-wideband or ISM [industrial, scientific and medical]).

In some embodiments, tags are coded by frequency shift encoding. In some embodiments, tags have a coding density of more than 1 bit/cm² (>1 bit/cm², >1.5 bit/cm², >2 bit/cm², >2.5 bit/cm², >3 bit/cm², >3.5 bit/cm², >3.8 bit/cm², >4 bit/cm², >5 bit/cm² . . . >10 bit/cm², or more). In some embodiments, tags have a coding density not exceeding 100 bit/cm² (<50 bit/cm², <20 bit/cm², <10 bit/cm², <5 bit/cm², etc.).

In some embodiments, the present invention provides radio-frequency identification (RFID) tags comprising a conductive patch having one or more slot resonators. In some embodiments, the conductive patch is upon a dielectric substrate (e.g., deformable substrate). In some embodiments, the patch is circular. In some embodiments, the patch has a diameter between 5 mm and 5 cm. In some embodiments, the one or more slot resonators are circular and concentric with the patch. In some embodiments, a tag comprises two or more slot resonators (e.g., 2, 3, 4, 5, 6, 7, 8, 9, 10, etc.), each with different lengths (e.g., circumferences). In some embodiments, the radius of the slot resonators is between 1 mm and 2.4 cm. In some embodiments, the width of the slot resonators is between 0.1 mm and 1 mm. In some embodiments, the patch is a single layer.

In some embodiments, the conductive layer is arranged in a zig-zag or other serpentine pattern to enable the underlying substrate to flex and return to its original shape without disrupting the conductivity of the pattern. In some embodiments, the pattern may contain a non-conductive gap or interdigitated conductors separated by a gap to enable the gap width to change in accordance with changing substrate geometry.

In some embodiments, the RFID tag emits an altered electromagnetic signal (e.g., response electromagnetic signal) upon interrogation by an interrogator electromagnetic signal; this can be accomplished either (or both) by passive changes in the electromagnetic shape and response of the tag and/or by the tag's resonant characteristics being incorporated into an oscillating circuit that may require external (e.g. battery) power or may be powered by the interrogating RF pulse. In some embodiments, one or both of the interrogator electromagnetic signal and the altered electromagnetic signal are ultra wide band signals. In some embodiments, one or both of the interrogator electromagnetic signal and the altered electromagnetic signal are between 3.1 and 10.6 GHz. In some embodiments, the altered electromagnetic signal is a frequency shifted version of the interrogator electromagnetic signal.

In some embodiments, the present invention provides radio-frequency identification (RFID) systems comprising an RFID tag described herein and a radio-frequency (RF) reader. In some embodiments, the RF reader emits an electromagnetic interrogator signal and receives an altered electromagnetic signal from said RFID tag. In some embodiments, the RF reader comprises separate interrogator and receiver devices. In some embodiments, the RF reader comprises a single device with interrogator and receiver components. In some embodiments, a system comprises a plurality of RFID tags that emit distinguishable altered electromagnetic signals.

In some embodiments, the present invention provides methods of target identification comprising: (a) associating the target with a radio-frequency identification (RFID) tag comprising a planar conductive patch upon a dielectric substrate having one or more slot resonators, wherein the RFID tag passively emits an altered electromagnetic signal upon interrogation by an interrogator electromagnetic signal; (b) interrogating one or more objects with the interrogator electromagnetic signal; and (c) identifying the target upon receiving the altered electromagnetic signal.

In some embodiments, the present invention provides methods for associating data with an object comprising attaching to said object to a chipless radiofrequency identification (RFID) tag having said data frequency shift encoded thereto. In some embodiments, data is an electromagnetic identification signature.

In some embodiments, the present invention provides RFID tags comprising: (a) a deformable (e.g., elongatable, bendable, flexible, stretchable, expandable, contactable, twistable, etc.) dielectric substrate; and (b) a conductive patch comprising one or more slot resonators disposed on or within the dielectric substrate; wherein upon deformation of the dielectric substrate, the shape and/or orientation of the conductive patch and/or slot resonators is altered. In some embodiments, when the dielectric substrate is in a first conformation, the RFID tag emits a first altered electromagnetic signal upon interrogation by an interrogator electromagnetic signal; and when the dielectric substrate is deformed into a second conformation, the RFID tag emits a second altered electromagnetic signal upon interrogation by the interrogator electromagnetic signal. In some embodiments, when the dielectric substrate is deformed into additional conformations, the RFID tag emits additional distinct altered electromagnetic signals upon interrogation by the interrogator electromagnetic signal.

DEFINITIONS

Figure 1:
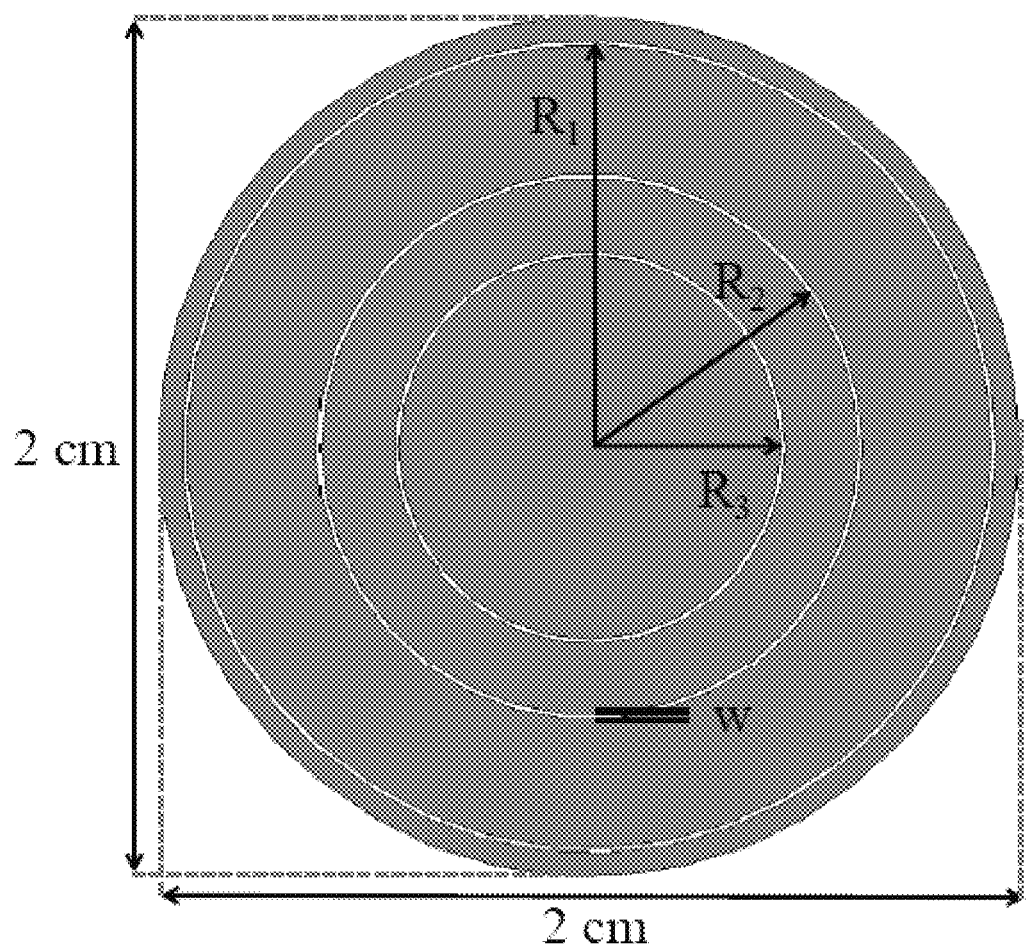
FIG. 1 shows a schematic of a chipless tag formed by a metal patch with three circular slots embedded in it. R1, R2 and R3 correspond to the mean radius of each resonator.

As used herein, the term "chip" refers to any semiconductor device or integrated circuit (e.g., those made with silicon, gallium arsenide, silicon-germanium, indium phosphide, etc.), and may include active devices and/or components selected from, but not limited to, imagers, light sensors, photo or laser diodes, capacitors, resistors, transistors, etc. As used herein, a "chipless" device is one lacking an active "chip."

While the shape- and (hence) property-shifting characteristics of the present invention enable a chipless RFID response, the invention is not limited to chipless approaches, and indeed, in some embodiments, altering the electromagnetic signature of the pattern is instead (or in addition) used to alter the properties or response of an RFID tag having a chip.

As used herein, the term "passive" refers to a device (e.g., RFID tag), component, or method that does not contain and/or require electronic circuitry or electrical power.

As used herein, the term "active" refers to a device (e.g., RFID tag), component, or method that contains and/or requires electronic circuitry or electrical power.

As used herein, the term "radio frequency identification," or "RFID tag," or "RFID device," and any combination or conjugation thereof, refers to any tags or devices capable of transmitting data for identification purposes to a receiver. In particular embodiments, an RFID tag is interrogated by a radio frequency (RF) signal and responds (e.g., by passive reflection) by transmitting an identifying signal encoding data.

As used herein, the term "patch," "patch antenna," or "patch tag" refers to a low profile, resonant device that can be mounted on a surface (e.g., a flat surface). Patches within the scope of the invention comprise a thin conductive material mounted on a dielectric surface. The conductive material acts as the antenna or reflective tag.

As used herein, the term "dielectric" or "dielectric material" refers to is an electrical insulator or insulating material that can be polarized by an applied electric field. When a "dielectric" is placed in an electric field, electric charges do not flow through the material as they do in a conductor. Rather, the charge is slightly shifted from the average equilibrium, causing dielectric polarization.

As used herein, the term "conductor" or "conductive material" refers to an electrical conductor of electric-conductive material, a material that readily permits the flow of electric charges there through.

As used herein, the term "slot resonator" or "slot antenna" refers to a gap in a conducting surface that reflects electromagnetic radiation at a specific identifiable frequency when exposed to an electromagnetic wave.

DETAILED DESCRIPTION

The present invention relates to radio-frequency identification (RFID) tags that produce a unique radar signature by passive reflection of an electromagnetic signal. In particular, provided herein are frequency-shift encoded, polarization-independent, chipless RFID tags, and methods of use and manufacture thereof.

A. Overview

For certain applications, RFID must compete (e.g., cost, efficiency, utility, etc.) with other identification technologies, such as, e.g., optical barcodes. For such applications, a new technology known as chipless RFID has been introduced (Hartmann, 2002; herein incorporated by reference in its entirety). This technology offers a huge cost reduction by eliminating the chip from the tags that now consist of a metal structure. In order to encode data on these metal structures, an Electromagnetic Signature (EMS) is applied. The EMS defines the unique behavior that a given object has in the presence of an electromagnetic wave, or more formally, the variation with time or frequency of the reflection coefficient of an object. Based on this principle, chipless RFID tags can be engineered to provide a unique electromagnetic signature that is used to encode data.

In some embodiments, chipless tags of the present invention comprise or consist of a conductive patch mounted upon, or configured for mounting upon, a dielectric material. In some embodiments, the conductive patch comprises one or more slot resonators embedded therein. The slot resonators may be cut into the conductive material or created upon production (e.g., printing) of the patch. In some embodiments, upon interrogation of the tag by an electromagnetic wave (EMW), each slot resonator results in the reflection of electromagnetic energy at a specific frequency (e.g., altered frequency). In some embodiments, based on the particular length(s) (e.g., circumference) of the slot resonator(s), the tag will reflect an identifiable electromagnetic signature (EMS).

In some embodiments, the EMS is dependent upon the shape and/or orientation of the conductive material and/or slot resonators on the dielectric material. Therefore deformation of the dielectric material, within or upon which the conductive material and/or slot resonators reside, results in alteration of the shape and/or orientation of the conductive material and/or slot resonators, and thereby modification of the EMS. In some embodiments, a detectably distinct EMS is produced depending upon the type and/or degree of deformation of the underlying dielectric. In some embodiments, the type or degree of deformation is identifiable by the detected EMS. In some embodiments, changes to the shape or size of the dielectric are detectable (e.g., in real-time) as changes in the EMS reflected by the slot resonators therein and/or thereon.

Exemplary approaches for encoding on chipless tags utilize time domain characteristics of the EMS and/or frequency domain characteristics of the EMS. In some embodiments, either or both techniques find use in embodiments of the present invention. When the time domain is used, a short pulse is sent to the tag and the time variation of the reflected signal is used to encode data (e.g., Girbau et al., 2012; herein incorporated by reference in its entirety). In the time domain, the encoding can be done based on the presence or absence of a frequency resonance, as in Islam and Karmakar, 2011 (herein incorporated by reference in its entirety), or in the relative position of the resonance with respect to an initial value; a technique called frequency shift encoding (e.g., Vena et al., 2011; herein incorporated by reference in its entirety). In some embodiments, the present invention utilizes frequency shift encoding to improve the coding capacity of chipless RFID tags. While some embodiments described herein find use with chipless RFID, the full scope of embodiments herein are not limited to chipless RFID.

In some embodiments, the present invention provides a single-layer, circular patch, upon a dielectric material, the patch comprising multiple slot resonators (e.g., circular) of differing length (e.g., circumference). In some embodiments, a tag is polarization independent, avoiding misalignment problems and reducing complexity for a reader.

B. Physical Characteristics

In some embodiments, a tag or patch may be of any suitable shape. Although exemplary embodiments herein depict a flat, round patch, in some embodiments, RFID tags may have significant depth or may be of any shape capable of reflecting a RF signal. In some embodiments, a tag is a radially symmetrical shape (e.g., circular, triangle, square, pentagon, hexagon, octagon, decagon, or any n-gon, where n=3-100. In some embodiments, the pattern can be zig-zag or meandering to enable the underlying substrate to flex. In some embodiments, radial symmetry allows the tag to function in a position and/or orientation independent manner. In some embodiments, radial symmetry allows the tag to be polarization-independent. In some embodiments, a tag is circular. In some embodiments, the length and width of the shape (e.g., circle) are significantly (e.g., at least 5-fold, at least 10-fold, at least 20-fold, at least 50-fold, at least 100-fold) greater than the thickness of the tag. In some embodiments, a tag has width and length dimensions, or a diameter, of 1 mm to 10 cm (e.g., 1 mm . . . 2 mm . . . 5 mm . . . 1 cm . . . 2 cm . . . 5 cm . . . 10 cm). In some embodiments, a tag has width and length dimensions, or a diameter, of 1 mm to 10 cm (e.g., 1 mm . . . 2 mm . . . 5 mm . . . 1 cm . . . 2 cm . . . 5 cm . . . 10 cm). For example, an exemplary tag is circular with a 2 cm diameter.

In some embodiments, an RFID tag comprises a patch of any suitable material (e.g., conductive material) for reflecting an electromagnetic signal (e.g., radio signal (e.g., UWB signal)). In some embodiments, a patch is a conductive material. Exemplary materials include metals (e.g., copper, gold, silver, titanium, etc.), alloys (brass, stainless steel, etc.), composites (e.g., woven fiberglass cloth with an epoxy resin binder (e.g., FR-4)), plastics, etc. Those of skill in the art of antenna design/manufacture will understand the types of conductive materials suitable for patch manufacture.

In some embodiments, an RFID tag comprises a substrate (e.g., upon which a conductive patch is placed e.g., printed, adhered to, etc.). In some embodiments, a substrate is any suitable dielectric material. Exemplary dielectric materials include polymer, such as Teflon, polypropylene or polyethylene, materials like epoxy or polyimide, of dielectric alloys, such as alumina or magnesium titanate or barium titanate. The substrate can also be a flexible foam. Those of skill in the art of antenna design/manufacture will understand the types of dielectric materials suitable for substrate manufacture.

In some embodiments, the substrate is a deformable material. For example, under some internal or external force, the substrate is deformed from a native or first conformation into a deformed or second conformation. The invention is not limited by the nature of the force or the type of deformation. Exemplary types of deformation include stretching, twisting, bending, folding, expanding, contracting, etc. In some embodiments, a substrate readopts the native or first conformation following release of the acting force. In other embodiments, a substrate retains a deformed or second conformation following release of the acting force.

In some embodiments, RFID tags and the specific components thereof (e.g., patch, substrate, etc.) comprise one or more metals, alloys, plastics, polymers, natural materials, synthetic materials, fabrics, etc. In some embodiments, components comprise one or more metals including but not limited to aluminum, antimony, boron, cadmium, cesium, chromium, cobalt, copper, gold, iron, lead, lithium, manganese, mercury, molybdenum, nickel, platinum, palladium, rhodium, silver, tin, titanium, tungsten, vanadium, and zinc. In some embodiments, components comprise one or more alloys including but not limited to alloys of aluminium (e.g., Al—Li, alumel, duralumin, magnox, zamak, etc.), alloys of iron (e.g., steel, stainless steel, surgical stainless steel, silicon steel, tool steel, cast iron, Spiegeleisen, etc.), alloys of cobalt (e.g., stellite, talonite, etc.), alloys of nickel (e.g., German silver, chromel, mu-metal, monel metal, nichrome, nicrosil, nisil, nitinol, etc.), alloys of copper (beryllium copper, billon, brass, bronze, phosphor bronze, constantan, cupronickel, bell metal, Devarda's alloy, gilding metal, nickel silver, nordic gold, prince's metal, tumbaga, etc.), alloys of silver (e.g., sterling silver, etc.), alloys of tin (e.g., Britannium, pewter, solder, etc.), alloys of gold (electrum, white gold, etc.), amalgam, and alloys of lead (e.g., solder, terne, type meta, etc.). In some embodiments, components comprise one or more plastics including but not limited to Bakelite, neoprene, nylon, PVC, polystyrene, polyacrylonitrile, PVB, silicone, rubber, polyamide, synthetic rubber, vulcanized rubber, acrylic, polyethylene, polypropylene, polyethylene terephthalate, polytetrafluoroethylene, goretex, polycarbonate, etc. In some embodiments, components comprise glass, textiles (e.g., from animal, plant, mineral, and/or synthetic sources), liquids, etc. In some embodiments, components comprise TEFLON, HDPE, nylon, PEEK, PTFE, PEBAX, or other suitable materials.

In some embodiments, a patch material is deformable and therefore its shape is altered upon deformation of the substrate it is associated with.

In some embodiments, a patch comprises a single layer of material. For example, a patch may be produced by the printing of a single layer of conductive ink (e.g., ink containing powdered or flaked conductive materials (e.g., silver ink)) onto a dielectric material. In some embodiments, the single layer patch is a metal foil (e.g., silver foil, gold foil, etc.). In some embodiments, a conductive patch is placed on a dielectric substrate by thin film deposition techniques (e.g., atomic layer deposition). In some embodiments, the single-layer patch is adhered to the dielectric a dielectric layer.

In some embodiments, patch is placed on a substrate to produce a tag that can subsequently by deployed for use as an RFID tag (e.g., attached to targets that one seeks to monitor, locate, track, etc.). In some embodiments, patch is placed on a dielectric portion of a target (e.g., label, packaging, etc.) to integrate the tag into the target.

C. Slot Resonators

In some embodiments, one or more slot resonators are embedded in an RFID tag. In some embodiments, a slot resonator is a gap in the conductive patch (e.g., exposing the underlying dielectric material) or sufficient length and width to produce an electromagnetic (e.g., RF (e.g., UWB)) signal of a specific reproducible frequency upon interrogation with an interrogator electromagnetic signal.

In some embodiments, a slot resonator is a continuous gap in the conductive material. In other embodiments, a resonator comprises two or more broken or non-continuous slots.

In some embodiments, the ends of a slot are unlinked. In other embodiments, a slot resonator is a continuous loop (e.g., linked ends, circle, oval, irregular loop, etc.).

In some embodiments, a slot resonator exhibits radial symmetry with respect to a central axis of the patch. In some embodiments, the slot resonators are the same shape (e.g., circular) as the patch, and/or are centered on the same axis. In some embodiments, both the patch and the resonator are circular. In some embodiments, the patch and the resonator are centered on the same axis.

In some embodiments, a single tag comprises multiple (e.g., 2, 3, 4, 5, 6, 7, 8, 9, 10 . . . 15 . . . 20 . . . 50) slot resonators. In some embodiments, slot resonators are non-overlapping. In some embodiments, slot resonators are nested (e.g., one or more slot resonators within the closed loop of another slot resonator). In some embodiments, multiple slot resonators are nested onto a patch by varying their size (e.g., length, radius/circumference). In some embodiments, placing multiple resonators (e.g., 2, 3, 4, 5, 6, 7, 8, 9, 10 . . . 20 . . . 50, or more) on a single patch (e.g., nested (e.g., concentrically) increases the coding capacity (e.g., per square centimeter) of the tag.

In some embodiments, a slot resonator on a patch reflects an electromagnetic frequency unique to the length of the slot (e.g., integer number of half wavelengths). In some embodiments, a slot is between 1 and 100 mm (e.g., 1 mm . . . 2 mm . . . 3 mm . . . 4 mm . . . 5 mm . . . 6 mm . . . 7 mm . . . 8mm . . . 9 mm . . . 10 mm . . . 11 mm . . . 12 mm . . . 13 mm . . . 14 mm . . . 15 mm . . . 16 mm . . . 17 mm . . . 18 mm . . . 19 mm . . . 20 mm . . . 25 mm . . . 30 mm . . . 40 mm . . . 50 mm . . . 60 mm . . . 70 mm . . . 80 mm . . . 90 mm . . . 100 mm). In some embodiments, multiple resonators of differing lengths are included in a patch to produce a tag that resonates at multiple frequencies (e.g., producing an electromagnetic signature (EMS)).

In some embodiments, the width of the slot and the type of materials used for the patch and substrate affect the brightness and/or strength of the reflected signal. In some embodiments, these characteristics are optimized to produce a reflected signal optimized to a particular application (e.g., short range, long range, dull signal, bright signal, etc.). In some embodiments, multiple slot resonators on a single patch may be differently optimized for different purposes. In some embodiments, slot resonators are optimized to produce the brightest, clearest signal. In some embodiments, slot resonators are between 0.01 mm and 1 mm in width (e.g., 0.01 mm . . . 0.02 mm . . . 0.03 mm . . . 0.04 mm . . . 0.05 mm . . . 0.06 mm . . . 0.07 mm . . . 0.08 mm . . . 0.09 mm . . . 0.1 mm . . . 0.2 mm . . . 0.3 mm . . . 0.4 mm . . . 0.5 mm . . . 0.6 mm . . . 0.7 mm . . . 0.8 mm . . . 0.9 mm . . . 1.0 mm).

In some embodiments, the shape and/or orientation (e.g., with respect to each other) of slot resonators is altered upon deformation of a substrate to which they are attached.

D. EMS

In some embodiments, each slot resonator within a patch produces a response to an interrogation EMW (e.g., RW (e.g., UWB)). The characteristics of each response wave are dictated by the patch material, dielectric material, slot length (e.g., determines response frequency), slot width (e.g., affects response brightness), etc. When multiple resonator slots are included on a tag, an electromagnetic signature is produced. In some embodiments, an RFID tag is detected and/or identified by detection or identification of the unique EMS with an interrogator wave (e.g., produced and/or received by a radio-frequency (RF) reader).

In some embodiments, a frequency shift encoding technique (e.g., Vena et al., 2011; herein incorporated by reference in its entirety) is used to encode data on a tag. In some embodiments, a coding density of over 3.8 bits/cm$^2$ (e.g., on a single layer tag) is achieved (4.0 bits/cm$^2$ . . . 5.0 bits/cm$^2$ . . . 6.0 bits/cm$^2$ . . . 8.0 bits/cm$^2$ . . . 10.0 bits/cm$^2$ . . . 20.0 bits/cm$^2$ . . . 30.0 bits/cm$^2$, or more). In some embodiments, tags provided herein achieve greater coding density than tags produced by other techniques (e.g., Vena et al., 2011; Islam et al., 2012; herein incorporated by reference in their entireties) (See, e.g., Table I).

In some embodiments, tags described herein use the UWB 3.1-10.6 GHz frequency band; although, in some embodiments, the technology is not limited to UWB or any particular frequency band. In some embodiments, tags use a frequency range greater than 500 MHz (e.g., >600 MHz, >1 GHz, >2 GHz, >3 GHz, >4 GHz, >5 GHz, >6 GHz, >7 GHz, >8 GHz, >9 GHz, >10 GHz, or more). In some embodiments, tags use a frequency range less than 100 GHz (e.g., <90 GHz, <50 GHz, <20 GHz, <15 GHz, <12 GHz, <11 GHz, <10 GHz, <9 GHz, <8 GHz, <7 GHz, or less).

In some embodiments, tags (e.g., those utilizing the 3.1-10.6 GHz portion of the spectrum) operate at a maximum transmit power of −41.3 dBm/MHz; although, in some embodiments, the technology is not limited to any particular transmit power. In some embodiments, tags operate at a transmit power not exceeding an absolute value of 500 dBm/MHz (e.g., <400 dBm/MHz, <300 dBm/MHz, <200 dBm/MHz, <100 dBm/MHz, <75 dBm/MHz, <50 dBm/MHz, <40 dBm/MHz, or less). In some embodiments, tags operate at a transmit power with an absolute value of at least 5 dBm/MHz (e.g., >10 dBm/MHz, >20 dBm/MHz, >30 dBm/MHz, >40 dBm/MHz). In some embodiments, tags utilize negative or positive frequency, e.g., are coherently detected.

D. Dynamics

In some embodiments, a patch or the substrate (e.g., dielectric material) upon or within which it resides is dynamic, or capable or adopting multiple (e.g., 2, 3, 4, 5, 6, 7, 8, 9, 10, 20, 30, 40, 50, 60, 70, 80, 90, 100, 500, 1000, or more) conformations. In some embodiments, as the tag is moved between conformations, the shape or orientation of the patch and/or slot resonators is altered (e.g., reversible or irreversibly). In certain embodiments, these physical alterations in the shape and/or orientation of the conductive material and/or slot resonators results in detectable alterations in the EMS produced thereby. In some embodiments, deformation of the patch or substrate alters the capacitance between caused by the slot resonators, resulting in changes to the resonance frequencies, and the resultant EMS. In some embodiments, deformation of the substrate results in one or more of: alteration of the shape of a slot resonator, alteration in the orientation of two or more slot resonators, alteration in the width or length of a sot resonator, etc. In some embodiments, small changes in the shape/orientation of the patch results in detectable changes in the EMS.

E. Applications

RFID devices (e.g., RFID tags, RFID labels, RFID inlays, etc.) and systems described herein find use in a wide variety of applications. For example, an RFID device may be associated with a retail or commercial product for identification, tracking, and or security purposes (e.g., attached to a package of the product or integrated into the package for purposes such as supply chain management or electronic article surveillance (EAS)). Exemplary commercial uses include payment by mobile device, asset management, inventory systems (e.g., warehouse management), product tracking (e.g., tracking of components during manufacture), access control, social media, and promotion tracking. The RFID tags and systems described herein also find use in transportation and logistics, public transportation (e.g., tagged cards or tickets, tags to locate busses or trains in transit), infrastructure management and protection (e.g., locating buried pipes, gas lines, wires, etc.), passports and identification cards/badges, animal identification, human identification, weapon identification/tagging, healthcare/hospitals (e.g., tracking/tagging drugs, patients, devices, and correlating them together etc.), barcoding, telemetry, race timing/monitoring, end-user applications (e.g., museums, parks, libraries, etc.).

In some embodiments, a patch tag is embedded within a circuit or other electrical connection. For example, a patch tag is embedded within a feedback loop, for example, of an amplifier, creating a feedback oscillator. Modulation of the shape or orientation of the patch (e.g., and the slot resonators therein) creates a modulated oscillator (e.g., at one or more frequencies). In some embodiments, modulation of the feedback is altered by deformation of the patch.

EXPERIMENTAL

Example 1

Circular Slot Behavior

Experiments were conducted during development of embodiments of the present invention to design a chipless RFID tag that can support a high bit coding capacity per square centimeter while maintaining good readability with variations of the incident angle and polarization. To meet these requirements, a slot ring resonator was used.

A. Slot Ring Resonator

An exemplary resonator (see, e.g., FIG. 1) is a circular metal patch with three embedded circular slot resonators. This structure presents a frequency selective behavior, and the resonant frequency of each slot resonator is defined by:

$$f = \frac{c}{2 \cdot \pi \cdot R_i} \sqrt{\frac{2}{\varepsilon_r + 1}} \quad (1)$$

where c is the speed of light in free space, $R_i$ the slot radius, and $\varepsilon_r$ the effective permittivity of the substrate. When an incident plane wave impinges on the structure, the backscattered signal presents a null near the slots resonant frequency. Since this resonant frequency depends on the slot radius, the structure's electromagnetic signature is tuned by adjusting the slot radii. This mechanism is used to encode data in the chipless RFID tag.

Figure 2:
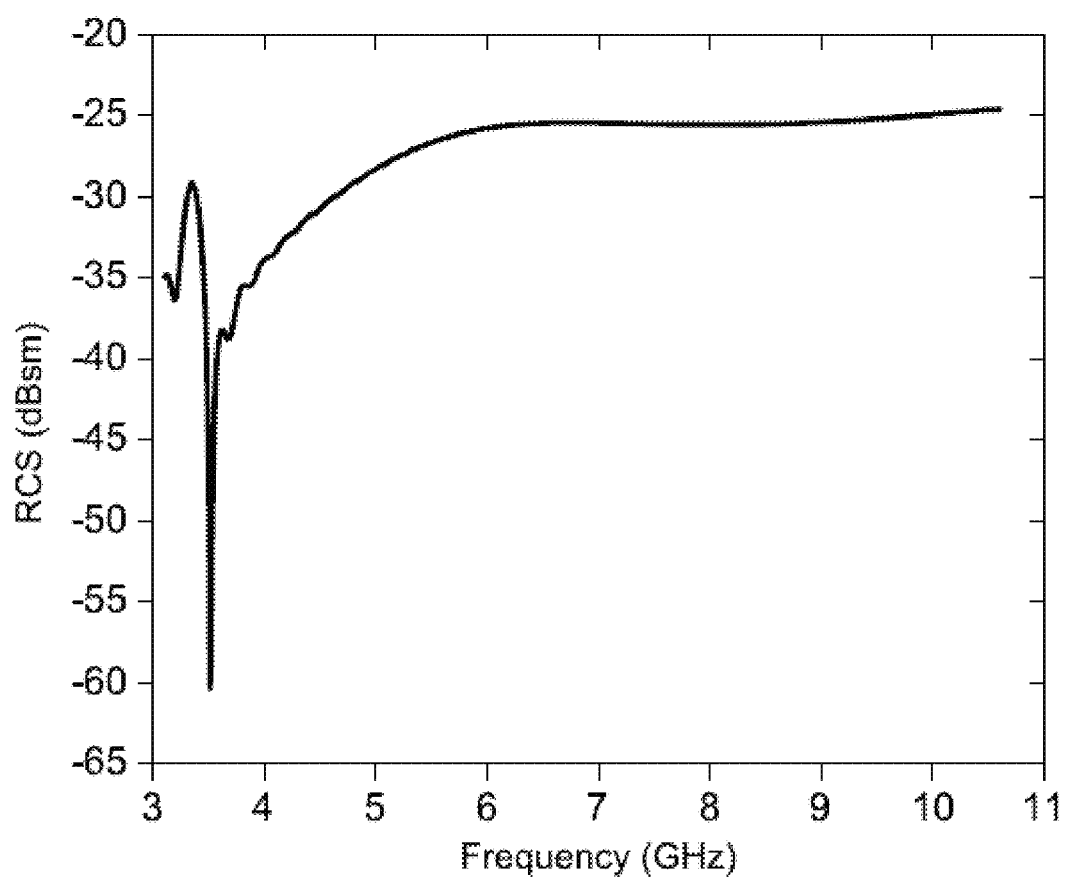
FIG. 2 shows a graph of radar cross-section (RCS) of a circular patch loaded with a single circular slot resonator. Null is at 3.5 GHz.

One feature of this type of resonant structures is that the 2nd and 3rd harmonics of the resonant frequencies are not present (see FIG. 2). This is due to the structure of the circular slot resonator, which does not allow the creation of currents for the even and odd harmonics. Also, due to its symmetric structure, the backscatter response of the structure is invariant to the polarization of the impinging plane wave.

B. Nested Circular Slots

Another advantage of the slot ring resonator is that it allows nesting multiple resonators in one structure. Therefore tags with electromagnetic signatures that includes multiple nulls are achievable, thereby increasing coding capacity. The limiting factor to nest multiple slots in the same tag is the coupling between them. This effect becomes stronger when two slots are very close to each other. In some embodiments, coupling between slots is overcome by maintaining a minimum distance between the slots. This results in a reduction in total bandwidth and reduced encoding capacity. Furthermore, provided that a minimum distance is maintained, coupling between slots is still present, which shifts the resonant frequencies of each slot. This effect is compensated for in the design process, in order to produce tags with resonances occur at the desired (e.g., expected) frequencies.

TABLE I

CODING DENSITIES OF DIFFERENT POLARIZATION INDEPENDENT CHIPLESS RFID TAG DESIGNS

|  | Coding density (bits/cm$^2$) |
| --- | --- |
| Ref. [6] | 2.1 |
| Ref. [7] | 2 |
| Our design | 3.8 |

An exemplary tag produced during development of embodiments of the invention has three slot resonators embedded inside a circular patch. The frequency bands assigned to each resonator are: 3.3 to 4.3 GHz for the first resonator; 5.3 to 6.5 GHz for the second resonator and 8 to 10.6 GHz for the third resonator (see TABLE II).

TABLE II

FREQUENCY SPECTRUM DISTRIBUTION, RESOLUTION AND FREQUENCY SLOTS PER RESONATOR

|  | Start frequency, GHz | Stop frequency, GHz | Frequency resolution, MHz | Frequency slots |
| --- | --- | --- | --- | --- |
| Resonator 1 | 3.3 | 4.3 | 25 | 40 |
| Resonator 2 | 5.1 | 6.1 | 30 | 33 |
| Resonator 3 | 7.2 | 10.6 | 100 | 34 |

C. Frequency Shift Encoding

The coding technique used is frequency shift encoding. This technique allows an increase in the coding capacity, encoding multiple bits per resonator. Since each resonator can take different values, a frequency slot is assigned to each value a resonance can have. The amount of frequency slots that a resonance can have depends on the total bandwidth that is assigned to the resonator ($BW_{resonator}$), and the minimum frequency shift that can be realized and measured, the frequency resolution ($\Delta f$). This resolution will depend on both, the quality factor of the resonator and the accuracy of the fabrication process. Therefore, for a given resonator the maximum number of frequency slots it can have will be given by:

$$C_{max} = \frac{BW_{resonator}}{\Delta f} + 1 \quad (2)$$

And the frequency that corresponds to each frequency slot is given by:

$$f_i = f_{i0} + C_i \cdot \Delta f \quad (3)$$

where $f_{i0}$ is the reference frequency of the resonator, which corresponds to its lowest resonant frequency, and $C_i$ is the frequency slot.

As an example, if a first resonator is assigned a frequency bandwidth between 3.1 and 4.1 GHz ($BW_{resonator}=1000$ MHz), and the frequency resolution is 25 MHz, the maximum number of frequency slots the resonator can have will be 1000=25=40, which corresponds to log 2(40)=5.32 bits.

D. Tag Design

Experiments were conducted during development of embodiments of the present invention to design a tag comprising a circular patch with three circular slot resonators nested inside. The patch has a radius of 10 mm, and the substrate will be FR4 composite with a thickness of 0.5 mm, electrical permittivity 2r=3.96 and a tangent loss tan d=0.015. The width of the resonators is 0.1 mm. The spectrum covered by each resonator as well as the frequency resolution and the number of frequency slots are provided in TABLE II.

This design provides a total of 44880 combinations that correspond to a coding capacity of 15.45 bits. Since the tag size is 2×2 cm² the bit density obtained is 3.86 bits/cm².

Example 2

Design Validation

In order to validate the tag design, tags have been simulated using an electromagnetic simulation tool. In each case, the radar cross section (RCS) of the tag has been characterized using a plane wave excitation that propagates in the normal direction of the tag and a RCS probe located at 300 mm from the tag.

Figure 3:
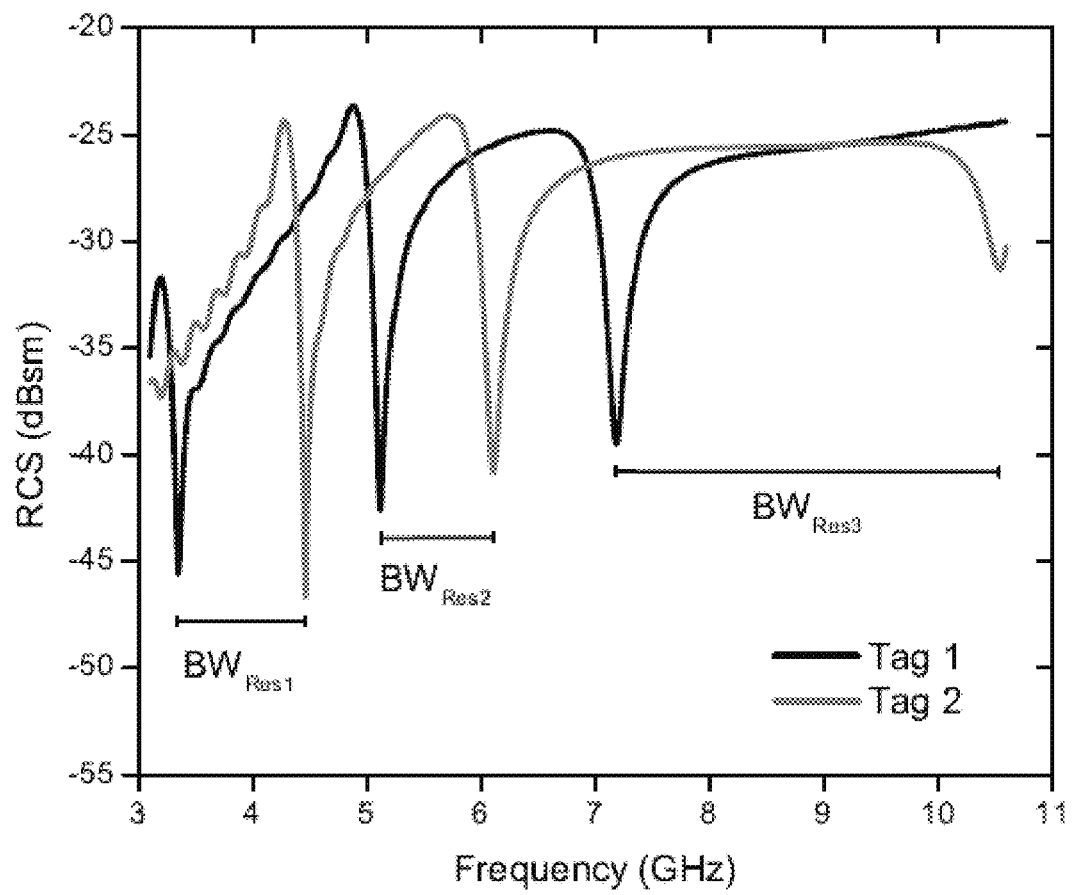
FIG. 3 shows a graph of RCS response of Tag 1 and Tag 2. The three resonances of Tag 1 happen at the lowest frequency of the bandwidth assigned to each resonator. The three resonances of Tag 2 happen at the highest frequency of the bandwidth assigned to each resonator. $BW_{Res1}$, $BW_{Res2}$ and $BW_{Res3}$ correspond to the bandwidths assigned to resonator 1, resonator 2 and resonator 3 respectively.

Experiments were performed to validate that the resonators of the tag can be tuned to all the frequencies of the bandwidth assigned to them in TABLE II. For this purpose two tags have been designed. Tag 1 has its three resonators tuned at the start frequencies of their assigned bandwidth, while Tag 2 has its three resonators tuned at the stop frequencies of their assigned bandwidth. The RCS response of these 2 tags and the assigned bandwidth for each resonator can be seen in FIG. 3.

Figure 4:
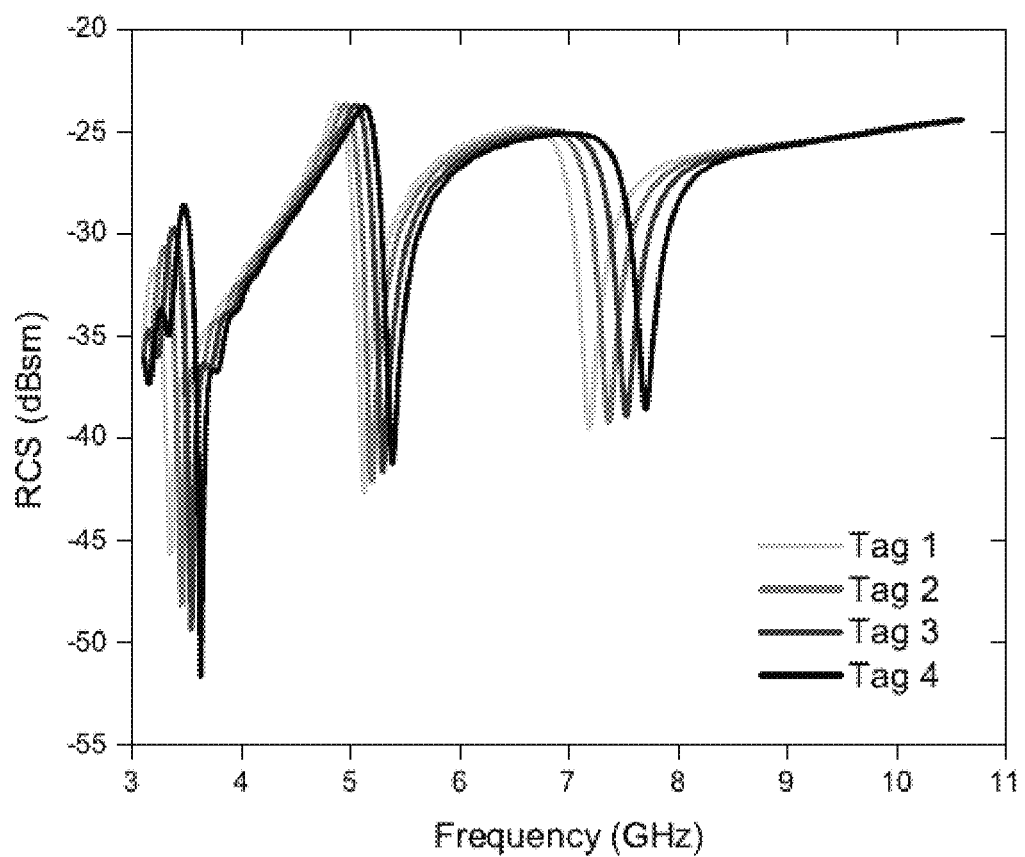
FIG. 4 shows RCS response of Tags 1 to 4. The bandwidth covers the whole spectrum defined for UWB (3.1 to 10.6 GHz).
Figure 5:
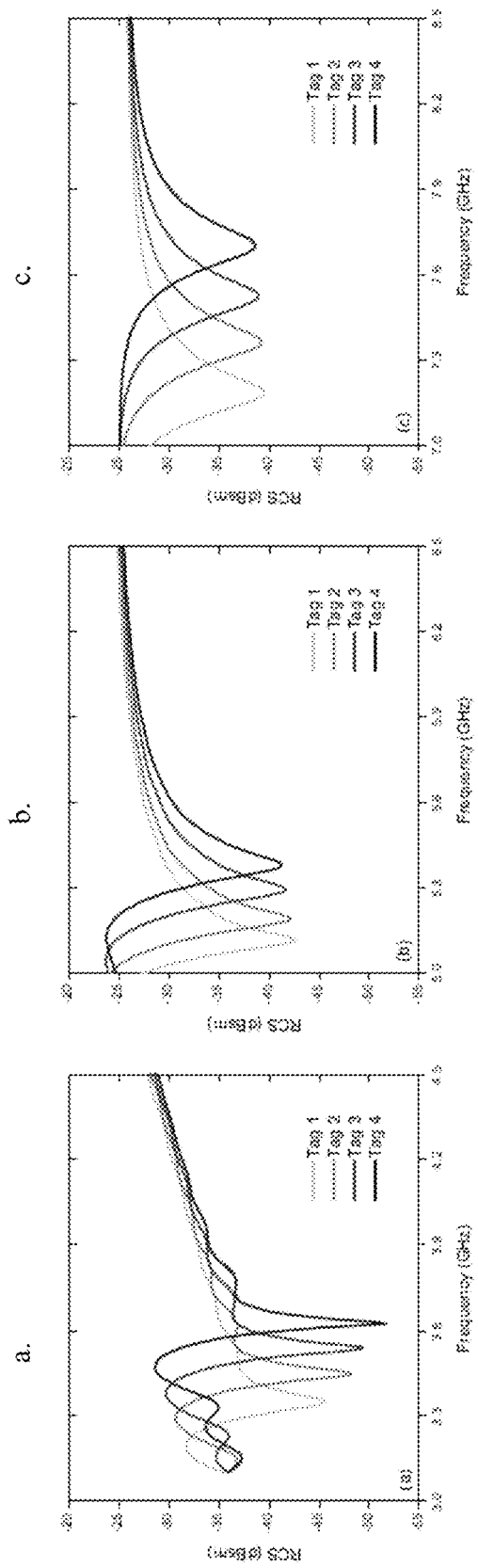
FIG. 5 shows graphs of RCS response of Tags 1 to 4. (Panel a) Zoom of the RCS response around the resonant frequencies of the first resonators. (Panel b) Zoom of the RCS response around the resonant frequencies of the second resonators. (Panel c) Zoom of the RCS response around the resonant frequencies of the third resonators.

Once it has been checked that the resonators can be tuned to cover the total bandwidth assigned for each one, four more tags have been designed. The dimensions of the resonators of each tag are provided in TABLE III, while the RCS response of the 4 tags is provided in FIG. 4. FIG. 5(*a*) presents a zoom of the RCS response around the first resonance of the 4 tags.

TABLE III

RESONATOR RADIUS DIMENSIONS
OF THE 4 DESIGNED TAGS

|  | R1, mm | R2, mm | R3, mm |
| --- | --- | --- | --- |
| Tag 1 | 9.4 | 6.3 | 4.5 |
| Tag 2 | 9.2 | 6.2 | 4.4 |
| Tag 3 | 9 | 6.1 | 4.3 |
| Tag 4 | 8.8 | 6 | 4.2 |

The length increment of the radii of these resonators is 0.2 mm, resulting in a frequency shift of 90 MHz between adjacent resonances. Since the frequency resolution assigned to the first resonator is 25 MHz, the radius step for this resonator is set to 0.05 mm in order to be able to cover all the frequency slots assigned to it. In FIG. 5(*b*) a zoom of the RCS response around the second resonance of the 4 tags is provided. The length increment of the radii of these resonators is 0.1 mm, resulting in a frequency shift of 76 MHz between adjacent resonances. Since the frequency resolution assigned to the second resonator is 30 MHz, the radius step for this resonator has to be set to 0.04 mm in order to be able to cover all the frequency slots assigned to it. Finally, in FIG. 5(*c*) a zoom of the RCS response around the third resonance of the four tags is provided. The length increment of the radii of these resonators is 0.1 mm, resulting in a frequency shift of 165 MHz between adjacent resonances. Since the frequency resolution assigned to the third resonator is 100 MHz, the radius step for this resonator is set to 0.06 mm in order to be able to cover all the frequency slots assigned to it. Furthermore, in order to be able to achieve the frequency resolution assigned to the three resonators, the fabrication accuracy of the tags is maintained below 1=2 of the minimum radius step, which in this case is 0.04 mm. Therefore, manufacturing accuracy has to be kept below 20 μm.

Example 3

Simulation Results

Figure 6:
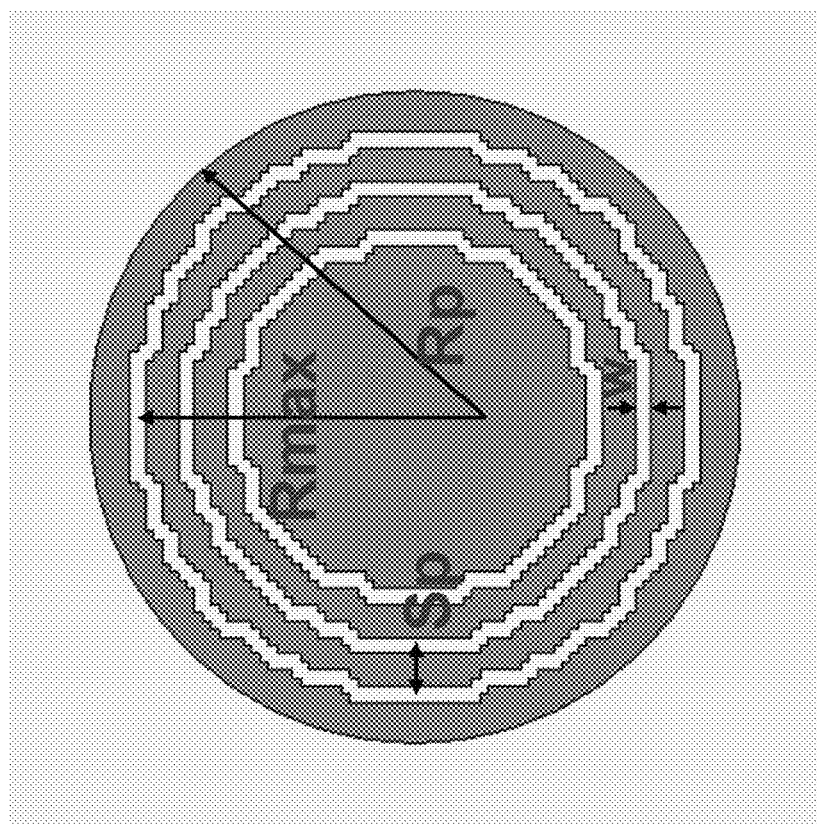
FIG. 6 shows a schematic of an exemplary RFID tag.
Figure 7:
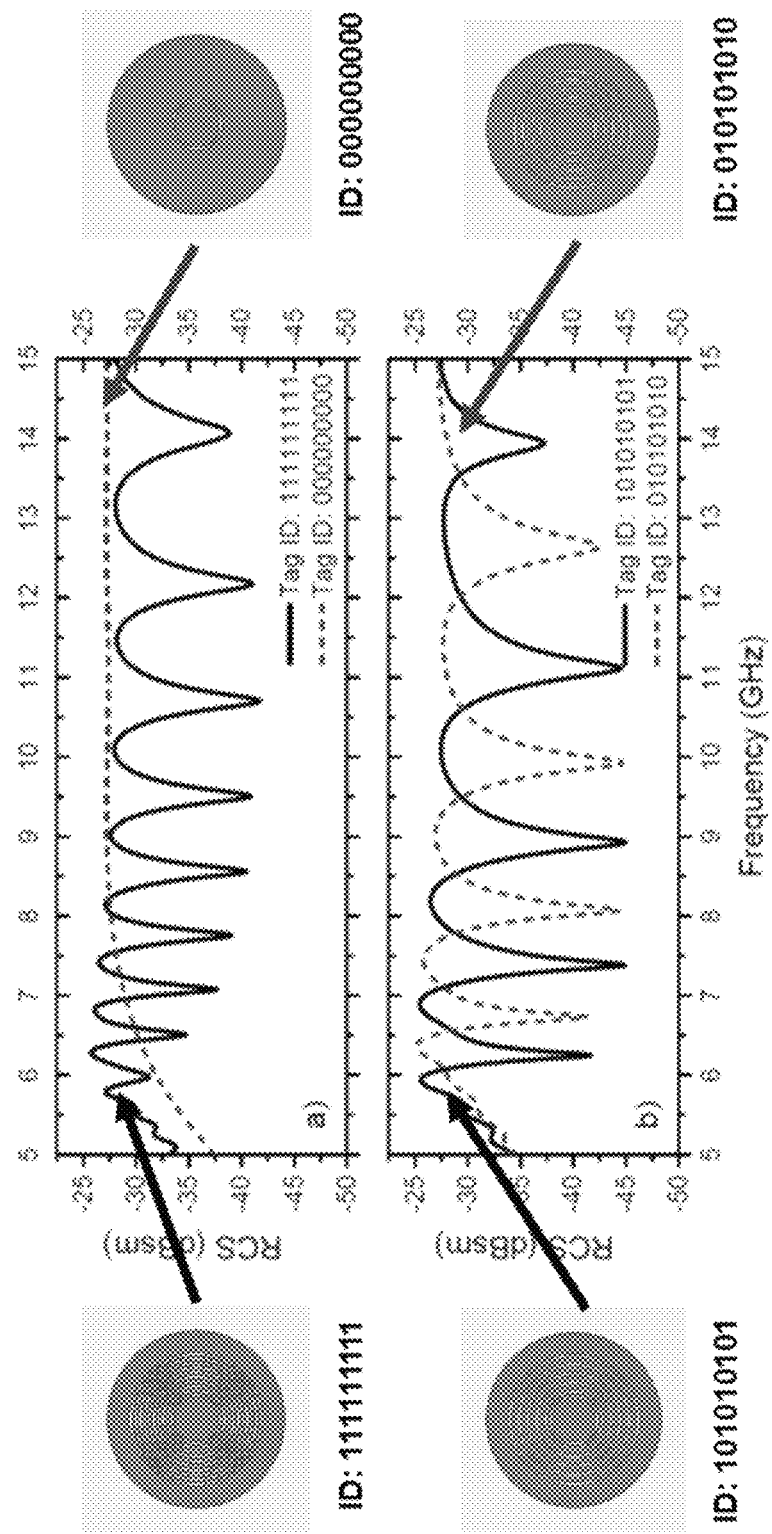
FIG. 7 shows images of four RFID tags and simulated data generated therefrom.

Experiments were conducted during development of embodiments described herein to perform wideband simulations of tag performance. Simulations were performed for tags of polytetrafluoroethylene (PTFE) fiberglass laminate substrates (Taconic TLX-9) (εr: 2.55, tan δ: 0.001, h: 0.5 mm) with dimensions of: $R_{max}$: 5.8 mm, $R_p$: 7.8 mm, w: 0.2 mm, and $S_p$: 0.4 mm (FIG. 6). Four tags having 9 bit capacity and coding density of 3.8 bits/cm² were simulated. FIG. 7 depicts the data from the simulations, with "1" corresponding to resonance (null) and "0" corresponding to no resonance. The simulations demonstrated a 15% improvement in coding density compared with tags based on a circular resonator.

Example 4

Tag Fabrication and Measurement

Figure 8:
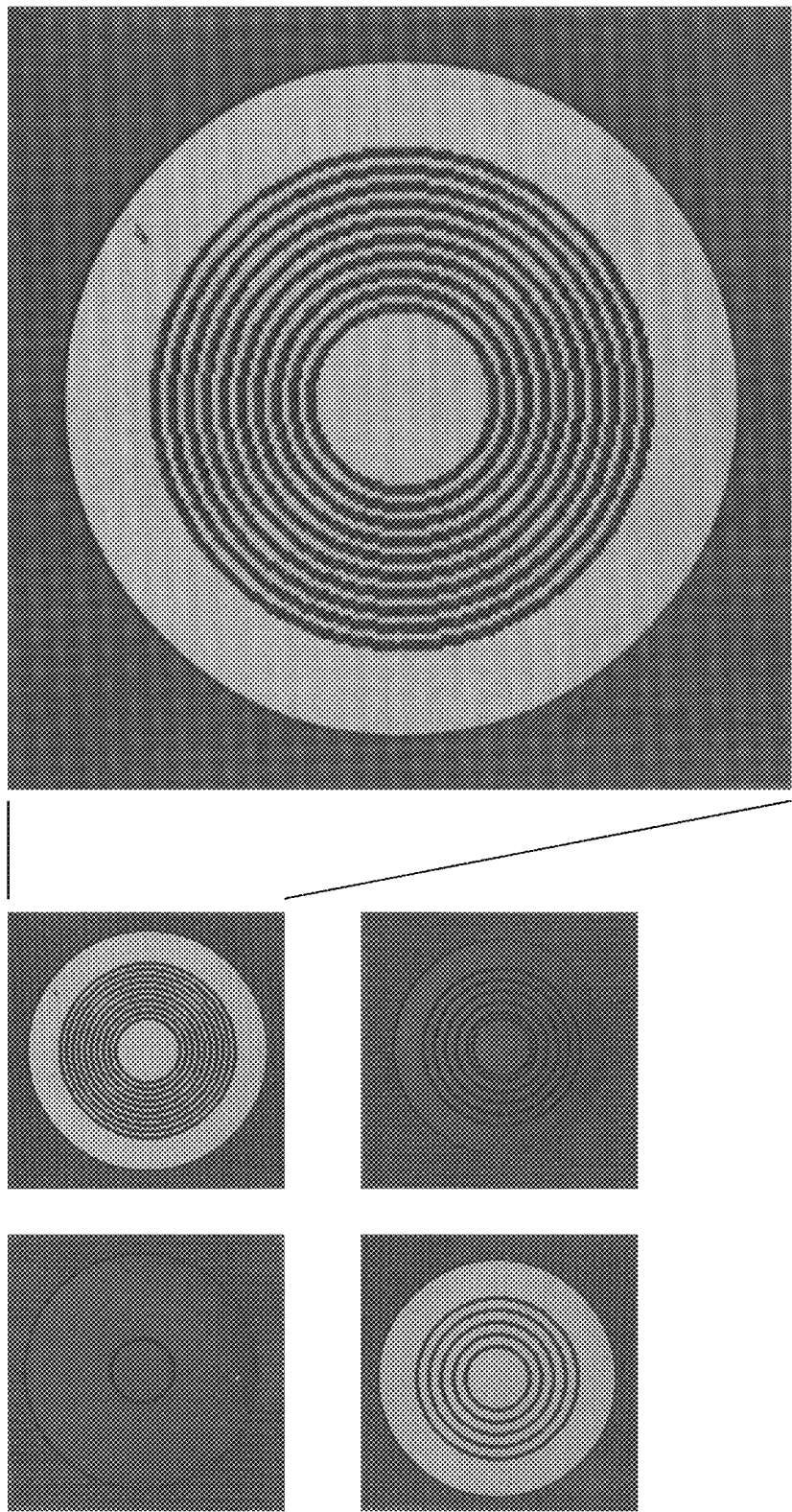
FIG. 8 shows exemplary fabricated RFID tags.
Figure 9:
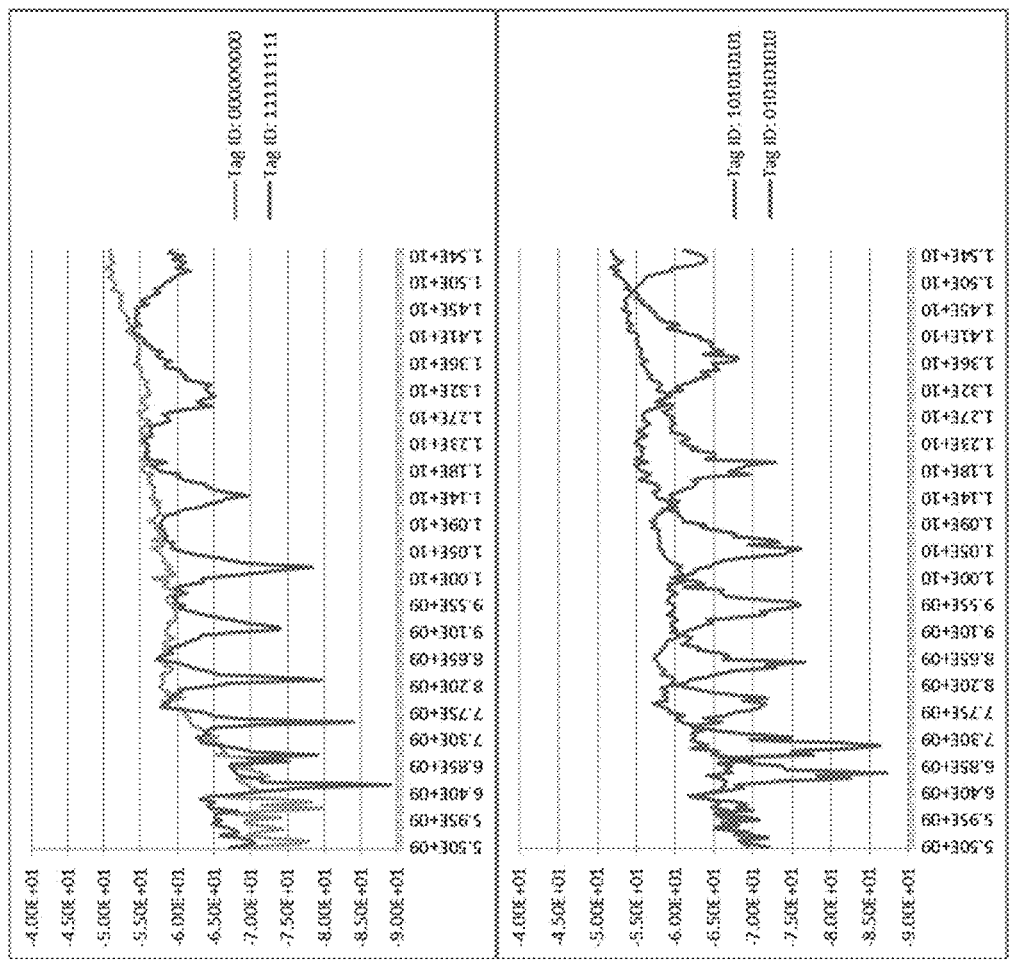
FIG. 9 shows representative data collected from the RFID tags depicted in FIG. 7.

RFID tags were manufactured comprising a polytetrafluoroethylene (PTFE) fiberglass laminate substrate (Taconic TLX-9), and a copper patch comprising a plurality of slot resonators (FIG. 8). The RFID tags were interrogated with an electromagnetic signal over the 5.5-15.5 GHz range, with an output power of −17 dBm, in an anechoic chamber at a distance of 20 cm. Calibration was performed to remove coupling effects and reflections in static elements of the environment.

Figure 10:
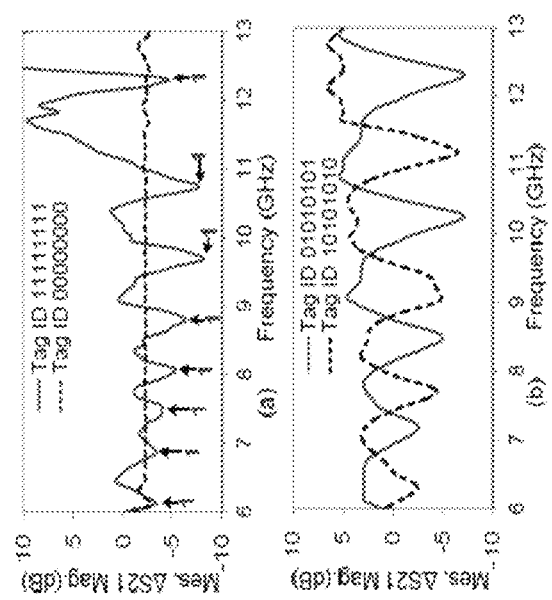
FIG. 10 shows data collected from the RFID tags depicted in FIG. 7.

FIG. 10 depicts the reflected spectra from several of the tags described herein, each having a different code.

Figure 11:
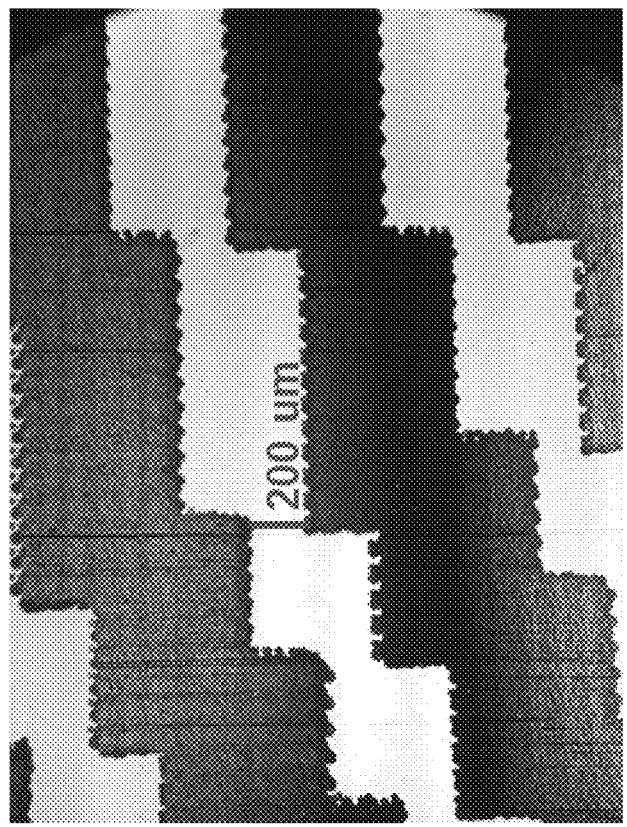
FIG. 11 shows an image of a fabricated RFID tag (24 mm diameter, 0.4 mm slot resonances), and an enlarged view of a portion thereof.
Figure 11:
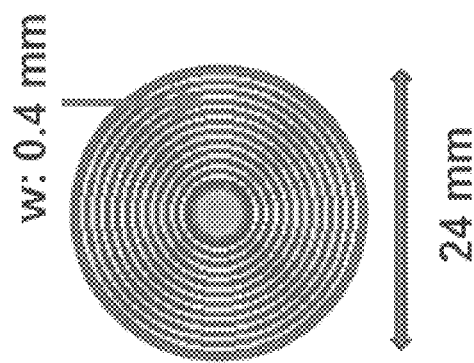

Measurements (FIG. 11) demonstrated significant improvement over previous results.

Example 5

Printed Chipless RFID Tag Measurements

Figure 12:
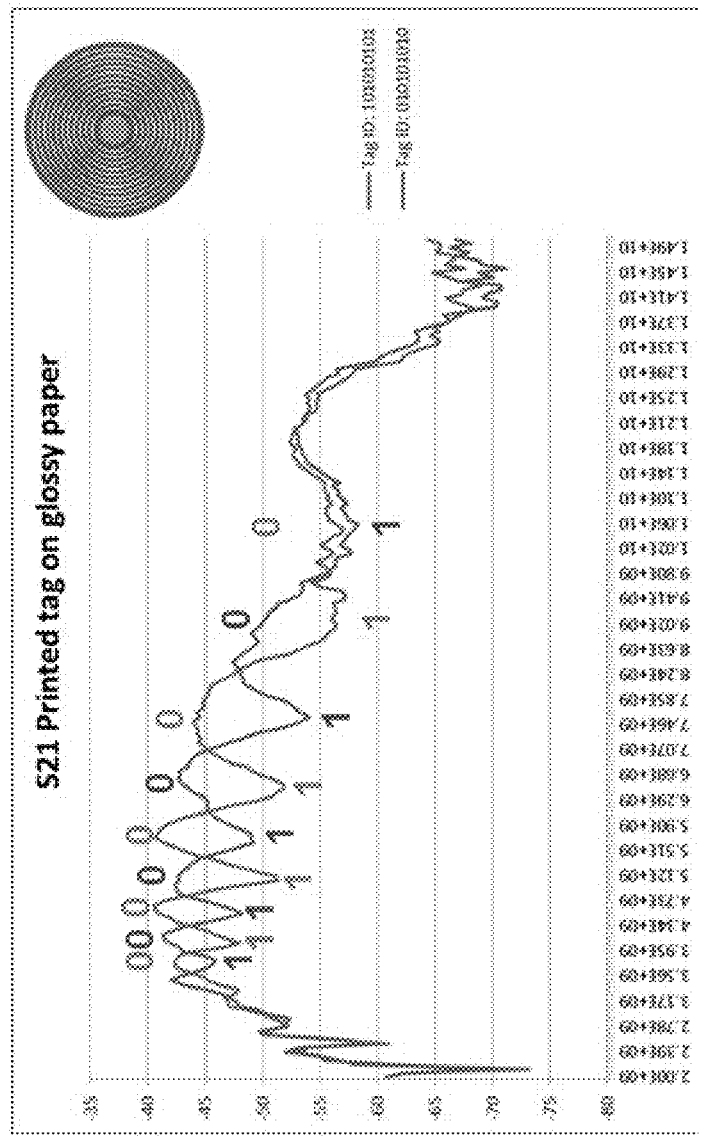
FIG. 12 shows data generated using a 24 mm RFID tag, printed on glossy paper, with 0.4 mm slot resonances.
Figure 13:
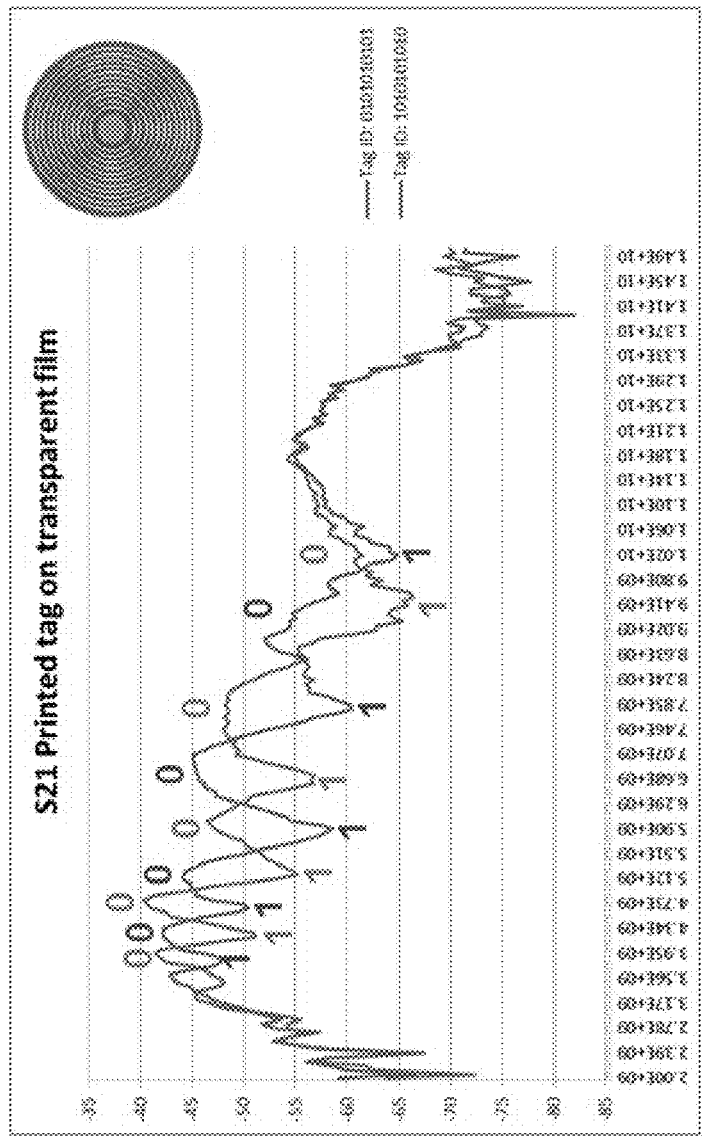
FIG. 13 shows data generated using a 24 mm RFID tag, printed on transparent film, with 0.4 mm slot resonances.
Figure 14:
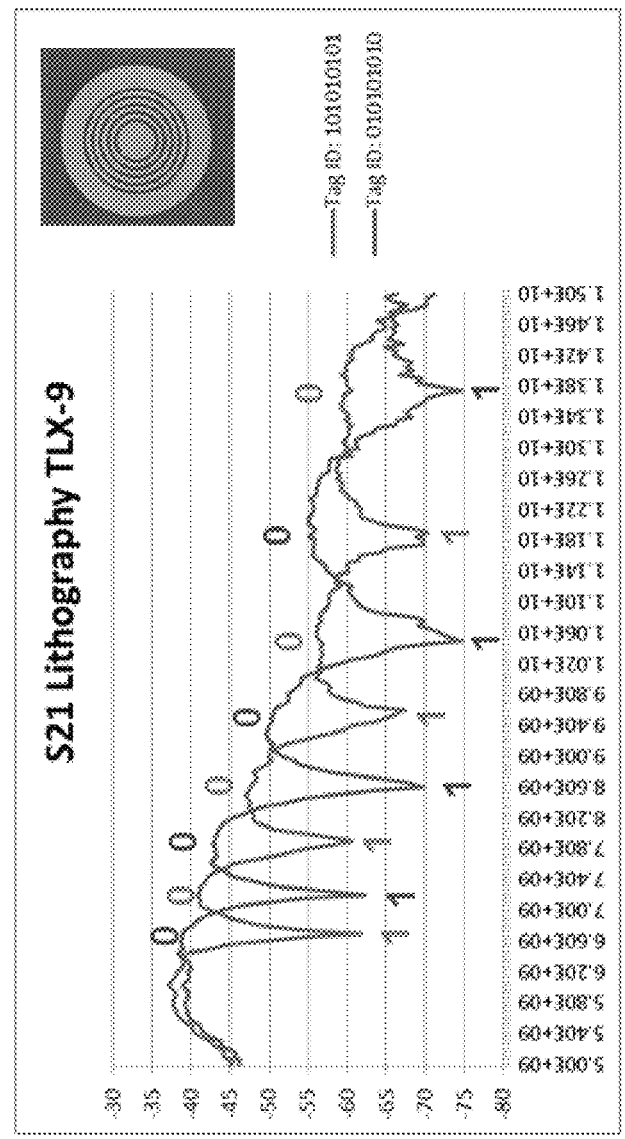
FIG. 14 shows data generated using a 24 mm RFID tag, printed on TLX-9, with 0.4 mm slot resonances.

RFID tags were manufactured with 24 mm diameter and either 11 0.4 mm slot resonances (FIG. 11) or 17 0.2 mm slot resonances. As is apparent from visual inspection, the 0.2 mm slot resonances resulted the in the presence of conductive bridges across the slot. Measurements of microwave reflection are shown using the 0.4 mm slot resonance tag, printed on glossy paper (FIG. 12), transparent film (FIG. 13), and TLX-9 (FIG. 14).

These experiments demonstrate that tags with a minimum feature size of 150-200 μm produce distinguishable resonances with interference between the resonances. These data demonstrate the feasibility of data coding within the RFID tags described herein.

REFERENCES

The following references and those included herein are herein incorporated by reference in their entireties.

Cheung, Y. Y.; Choy, K. L.; Lau, C. W.; Leung, Y. K., "The impact of RFID technology on the formulation of logistics strategy," Portland International Conference on Management of Engineering and Technology, 2008. PICMET 2008., pp.1673, 1680, 27-31 Jul. 2008.

Kin Seong Leong; Mun Leng Ng; Cole, P. H., "Investigation on the deployment of HF and UHF RFID tag in livestock identification," Antennas and Propagation Society International Symposium, 2007 IEEE, pp. 2773, 2776, 9-15 Jun. 2007.

C. S. Hartmann, "A global SAW ID Tag with Large data capacity," in Proc. IEEE Ultrasonics Symp., 2002, pp. 6569.

Girbau, D.; Lazaro, A.; Ramos, A., "Time-coded chipless RFID tags: Design, characterization and application," International Conference on RFID-Technologies and Applications (RFID-TA), 2012 IEEE, pp. 12, 17, 5-7 Nov. 2012

Islam, M. A.; Karmakar, N., "Design of a 16-bit ultra-low cost fully printable slot-loaded dual-polarized chipless RFID tag," Asia-Pacific Microwave Conference Proceedings (APMC), 2011, pp. 1482, 1485, 5-8 Dec. 2011.

A. Vena, E. Perret, and S. Tedjini, "Novel compact RFID chipless tag," in Proc. PIERS, Marrakesh, Morocco, March 2023, 2011.

Islam, M. A.; Yap, Y.; Karmakar, N.; Azad, A. K. M., "Orientation independent compact chipless RFID tag," IEEE International Conference on RFID-Technologies and Applications (RFID-TA), 2012, vol., no., pp. 137,141, 5-7 Nov. 2012.

The invention claimed is:

1. A radio-frequency identification (RFID) tag comprising a conductive patch upon a deformable dielectric substrate, wherein the conductive patch comprises one or more resonators, wherein the RFID tag is chipless, wherein the RFID tag emits a response signal having an electromagnetic signature (EMS) upon interrogation by an interrogator electromagnetic signal, wherein deformation of the dielectric substrate results in deformation of the slot resonators, wherein the EMS of the response signal is altered by deformation of the dielectric substrate and slot resonators, and wherein a greater degree of deformation of the dielectric substrate and slot resonators produces a greater degree of alteration of the EMS.

2. The RFID tag of claim 1, wherein the type of deformation is selected from elongating, stretching, folding, twisting, bending, stretching, and contracting.

3. A method comprising:
(a) placing the RFID tag of claim 1 on a target;
(b) interrogating the RFID tag with the interrogator electromagnetic signal; and
(c) detecting the response signal;
wherein alteration of the EMS indicates movement of the target.

4. The method of claim 3, wherein the RFID tag is interrogated and the response sig al is detected as a function of time.

5. The method of claim 4, wherein the EMS is measured at distinct time-points or in real time.

6. The method of claim 3, wherein the target is a human, the RFID tag is placed on a body part, and alteration of the EMS indicates movement of the body part.

7. The method of claim 6, wherein the body part is selected from the group consisting of an ankle, knee, elbow, shoulder, and wrist.

8. The RFD tag of claim 6, wherein the degree of alteration of the EMS corresponds to the degree of movement of the body part.

9. The method of claim 3, wherein the target is a structure, the RFID tag is placed on a portion of the structure and alteration of the EMS indicates movement of the portion of the structure.

10. The method of claim 9, wherein the structure is an airframe or bridge.

11. The RFID tag of claim 9, wherein the degree of alteration of the EMS corresponds to the degree of movement of the portion of the structure.

* * * * *

UNITED STATES PATENT AND TRADEMARK OFFICE
CERTIFICATE OF CORRECTION

PATENT NO. : 10,402,604 B2
APPLICATION NO. : 15/632887
DATED : September 3, 2019
INVENTOR(S) : Daniel W. van der Weide and Marcos Martinez It is certified that error appears in the above-identified patent and that said Letters Patent is hereby corrected as shown below:

In the Claims

In Column 16, Claim 2, Line 8 should read:
twisting, bending, and contracting.

In Column 16, Claim 4, Line 17 should read:
interrogated and the response signal is detected as a function In Column 16, Claim 8, Line 27 should read:
8. The RFID tag of claim 6, where the degree of Signed and Sealed this
Twenty-seventh Day of October, 2020

Andrei Iancu
*Director of the United States Patent and Trademark Office*